United States Patent
DeHaven

(10) Patent No.: US 8,908,394 B2
(45) Date of Patent: Dec. 9, 2014

(54) POWER SUPPLY WITH DIGITAL FEEDBACK SIGNALING

(75) Inventor: Maxwell Scott DeHaven, Middlebury, IN (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 397 days.

(21) Appl. No.: 13/088,650

(22) Filed: Apr. 18, 2011

(65) Prior Publication Data

US 2012/0262956 A1   Oct. 18, 2012

(51) Int. Cl.
*H02M 3/335* (2006.01)

(52) U.S. Cl.
CPC .................................. *H02M 3/33515* (2013.01)
USPC ................... 363/21.08; 363/21.04; 363/21.09

(58) Field of Classification Search
USPC ................... 323/283; 363/21.04, 21.08, 21.09
See application file for complete search history.

(56) References Cited

U.S. PATENT DOCUMENTS

| | | | | |
|---|---|---|---|---|
| 4,166,690 A | * | 9/1979 | Bacon et al. | 399/89 |
| 4,967,108 A | * | 10/1990 | Lee et al. | 327/557 |
| 6,651,201 B1 | * | 11/2003 | Adams et al. | 714/733 |
| 7,280,376 B2 | | 10/2007 | McDonald et al. | |
| 7,288,924 B2 | * | 10/2007 | Trandafir et al. | 323/283 |
| 7,643,315 B2 | | 1/2010 | Blaha et al. | |
| 7,649,345 B2 | * | 1/2010 | Kwan | 323/283 |
| 2002/0057080 A1 | * | 5/2002 | Telefus et al. | 323/283 |
| 2008/0259654 A1 | | 10/2008 | Huynh et al. | |

* cited by examiner

*Primary Examiner* — Adolf Berhane
*Assistant Examiner* — Henry Lee, III

(57) ABSTRACT

Apparatus and methods are provided for use with power supplies. A controller regulates power supply output by way of feedback signaling. Current pulses generated by an electrical load are detected in the feedback signaling and are processed to derive a sequence of digital bits. The digital bits are subjected to validity testing and decoded as digital data. Operations of the power supply are adjusted and requests for information are answered in accordance with the digital data.

15 Claims, 6 Drawing Sheets

FIG. 7

| IDLE PERIOD | ---- | 0000 | 702 |
| START BITS | [23:19] | 10110 | 704 |
| WRITE/nREAD BIT | [18] | X | 706 |
| ADDRESS | [17:13] | XXXXX | 708 |
| DATA | [12:5] | XXXXXXXX | 710 |
| CRC | [4:0] | XXXXX | 712 |

TIME ↓

| 01 H | TEMP STATUS | POWER SUPPLY TEMPERATURE | 802 |
| 09 H | COURSE VOLTS | COURSE VOLTAGE TRIM | 804 |
| 0B H | FINE VOLTS | FINE VOLTAGE TRIM | 806 |
| 0D H | SLEEP | SLEEP ENABLE/DISABLE | 808 |
| 1D H | CHIP ID | CONTROL CHIP SERIAL NUMBER | 810 |

800

POWER SUPPLY WITH DIGITAL FEEDBACK SIGNALING

BACKGROUND

Power supplies are commonly used to provide electrical energy to a load or loads. Such power supplies regulate their voltage or current outputs in accordance with fixed, predetermined parameters and within respective tolerances. Designers are therefore required to compromise to varying extents when selecting a power supply to satisfy the energy needs of a particular load. Supply-versus-load mismatch can cause significant inefficiencies and loss of performance at surprisingly low differentials. The present teachings address the foregoing and other concerns.

BRIEF DESCRIPTION OF THE DRAWINGS

The present embodiments will now be described, by way of example, with reference to the accompanying drawings, in which:

FIG. 7 is a table depicting a communication protocol according to an other example of the present teachings; and FIG. 8 is a table depicting parameters and functions of a slave controller according to an example of the present teachings.

DETAILED DESCRIPTION

Introduction

Figure 1:
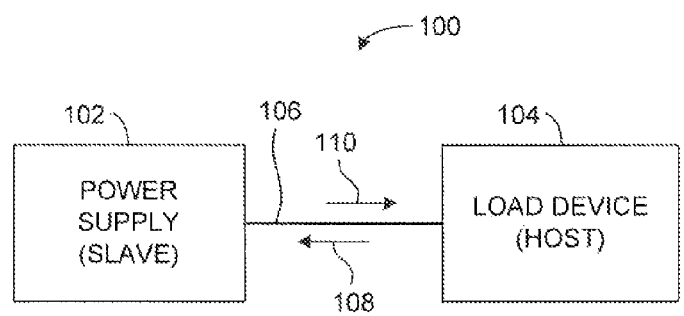
FIG. 1 is a block diagram of a system according to one example of the present teachings.

Apparatus and methods are provided for use with power supplies. A controller regulates an output of a power supply by way of feedback signaling. The feedback signaling is sensed within the power supply by way of a secondary winding of a transformer. Current pulses generated by an electrical load are detected in the feedback signaling and are processed to derive a sequence of digital bits. The digital bits are subjected to validity testing and decoded as digital data. Operations of the power supply are adjusted and requests for information are answered in accordance with the digital data.

In one example, electronic circuitry is configured to apply a moving average filter to an electrical feedback signal to derive a filtered signal. The circuitry is also configured to compare the filtered signal to a pair of threshold values so as to derive a digital bit stream. The electronic circuitry also provides the digital bit stream to an asynchronous decoder state machine (ADSM), which includes a register and a bit counter. The ADSM loads the digital bit stream into the register and increments the bit counter in accordance with validity testing states. The electronic circuitry is also configured to parse the contents of the register using the bit counter to derive digital data. The electronic circuitry is further configured to adjust an operating parameter of an electrical power supply in accordance with the digital data.

In another example, a controller is configured to regulate an output of electrical energy from a power supply by way of feedback signaling. The feedback signaling is provided by way of a secondary winding of a transformer of the power supply. The controller is also configured to sense pulse signals from a load by way of the feedback signaling, and to process the pulse signals to derive digital data. The controller is further configured to adjust respective operating parameters of the power supply in accordance with the digital data.

In yet another example, a storage media includes a program code. The program code is configured to cause one or more processors to encode a digital message to be sent to a power supply. The program code is also configured to cause the one or more processors to modulate an electrical current to derive a sequence of pulses in accordance with the digital message. The program code is also configured to cause the one or more processors to receive a digital reply from the power supply. The program code is further configured to cause the one or more processors to control an apparatus receiving electrical energy from the power supply in accordance with the digital reply.

In yet another example, an asynchronous decoder state machine (ADSM) is configured to detect of a predefined idle period within a digital bit stream. The ADSM is also configured to detect valid rising edges and falling edges and bit-times within the digital bit stream. The ADSM is also configured to detect a valid sequence of start bits within the digital bit stream. The ADSM is additionally configured to load the digital bit stream into a register and to increment a bit counter in accordance with the loading. The ADSM is further configured to reset the register and the bit counter to respective start values in response to detecting an invalid event within the digital bit stream.

Illustrative System

Reference is now directed to FIG. 1, which depicts a block diagram of a system 100. The system 100 is illustrative and non-limiting with respect to the present teachings. Thus, other apparatuses, devices or systems can be configured and/or operated in accordance with the present teachings.

The system 100 includes a power supply 102 and a load device 104. The power supply 102 provides regulated electrical energy to the load device 104 by way of connection 106. In particular, one or more voltages are regulated at respective values by the power supply 102 and provided to the load device 104. The power supply 102 is also referred to as a "slave" entity, while the load device is referred to as a "host" entity, for purposes of the present teachings. In one example, the load device 104 is defined by a printer or imaging apparatus. Other types of load device 104 can also be used in accordance with the present teachings.

The load device (host) 104 is configured to communicate information or requests for information to the power supply (slave) 102 by way of current pulses 108. That is, the load device 104 is configured to modulate the electrical current flow thereto such that digital information can be conveyed to the power supply 102. In turn, the power supply 102 is configured to detect these current pulses 108 and to decode them as meaningful digital data.

The power supply 102 can communicate information to the load device 104 by way of voltage modulation 110. Specifically, the regulation value of the voltage output from the power supply 102 is modulated so that pulses or sags 110 in voltage are conveyed to the load device 104. The load device 104 is configured to detect this voltage modulation 110 and to decode it as meaningful information, a reply to a query or acknowledgement of a prior message, and so on.

The system 100 is illustrative of principles of the present teachings. Further discussion is provided below regarding the communication of information between a power supply and load device, the decoding and verification of that information, and actions taken in response to that information.

Illustrative Power Supply

Figure 2:
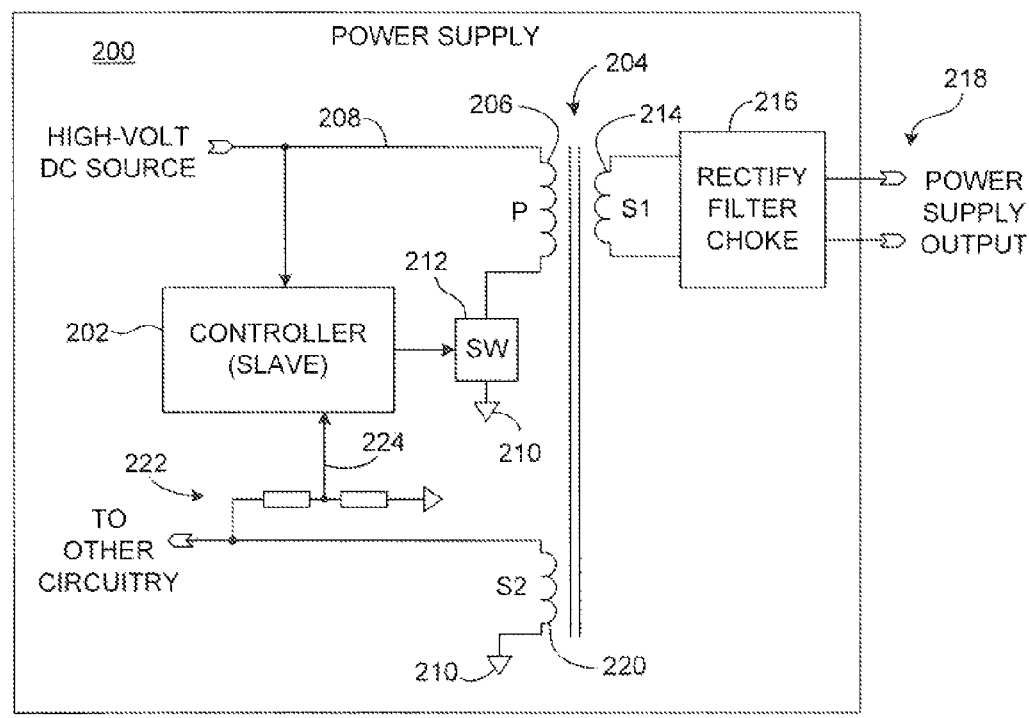
FIG. 2 is a block schematic diagram of a power supply according to an example of the present teachings.

Attention is now turned to FIG. 2, which depicts a schematic block diagram of selected aspects of a power supply 200 according to the present teachings. The power supply 200 is illustrative and non-limiting in nature. Therefore, other power supplies, apparatus and systems can be defined and operated in accordance with the present teachings.

The power supply 200 includes a controller 202. The controller 202 is also referred to as a "slave" unit or entity for purposes herein. The controller 202 can be variously defined by electronic circuitry, a processor or microcontroller running a program code, and so on. For purposes of example herein, the controller 202 is defined, at least in part, by an application-specific integrated circuit (ASIC), as available from Texas Instruments, Dallas, Tex., USA. As such, the controller 202 has been configured and programmed, respectively, to operate in accordance with the present teachings. Further details regarding the controller 202 are provided below.

The power supply 200 also includes a power transformer 204. The transformer 204 is includes a primary winding 206 coupled to source of high-voltage direct-current (HVDC) energy by way of a node 208. The specific identity and constituency of the HVDC energy source is not germane to the present teachings. The primary winding 206 is also coupled to a ground node 210 by way of a switch 212. In one example, the switch 212 is a defined by a power metal-oxide semiconductor field-effect transistor (i.e., power MOSFET). Other suitable switches 212 can also be used.

The power transformer 204 includes a secondary winding 214. Electrical power is transferred from the primary winding 206 to the secondary winding 214 by inductive coupling. In one example, the power transformer 204 is a step-down transformer—that is, the (average) voltage output from the secondary winding 214 is lesser than the (average) voltage applied to the primary winding 206.

The power supply 200 further includes rectification, filtering and choke (RFC) circuitry 216. The RFC circuitry 216 can include any suitable power conditioning or filtering circuitry. In one example, the RFC circuitry 216 includes a full-wave bridge rectifier (not shown), one or more filter capacitors (not shown) and a radio-frequency choke or inductor (not shown). As such, the RFC circuitry 216 is configured to rectify the electrical output from the secondary winding 214 and to attenuate any ripple or RF noise present in that electrical energy.

The RFC circuitry 216 couples the conditioned electrical energy to an output 218. It is to be understood that the specific configuration and constituency of the RFC circuitry 216 are not germane to the present teachings, and that such is depicted in block diagrammatic form in the interest of clarity. One having ordinary skill in the electrical or related arts can appreciate that various configurations of RFC circuitry 216 can be used.

The power transformer 204 also includes a secondary winding 220. The secondary winding 220 is configured to provide a feedback signal corresponding to the output 218. That is, the secondary winding 220 provides a voltage signal that varies in direct relationship with the output 218. Thus, the secondary winding 220 provides feedback with respect to the instantaneous voltage and current at the output 218 by way of electromagnetic coupling.

The feedback signal from the secondary winding 220 is reduced in magnitude by way of voltage divider 222 such that a scaled-down feedback signal is provided at a node 224. The feedback signal at the node 224 is provided to or sensed by the controller 202. The controller 202 also senses the HVDC energy at the node 208.

The controller 202 is configured to regulate a voltage at the output 218 from the power supply 200. In particular, the controller 202 is configured to provide a pulse-width modulated (PWM) control signal to the switch 212. The controller 202 is also configured to sense the feedback signal at the node 224 and to adjust the PWM control signal so as to maintain a present operating level at the output 218 (e.g., thirty-two volts DC).

Additionally, the controller 202—the ASIC introduced above—is defined by a plurality of characteristics and adjustable parameters. Among these, the controller 202 includes both course and fine voltage settings or calibrations that can be adjusted by loading respective values into registers within the controller 202. Additional discussion of the adjustable parameters of the controller 202 according to the present teachings is provided hereinafter.

Illustrative Printing Apparatus

Figure 3:
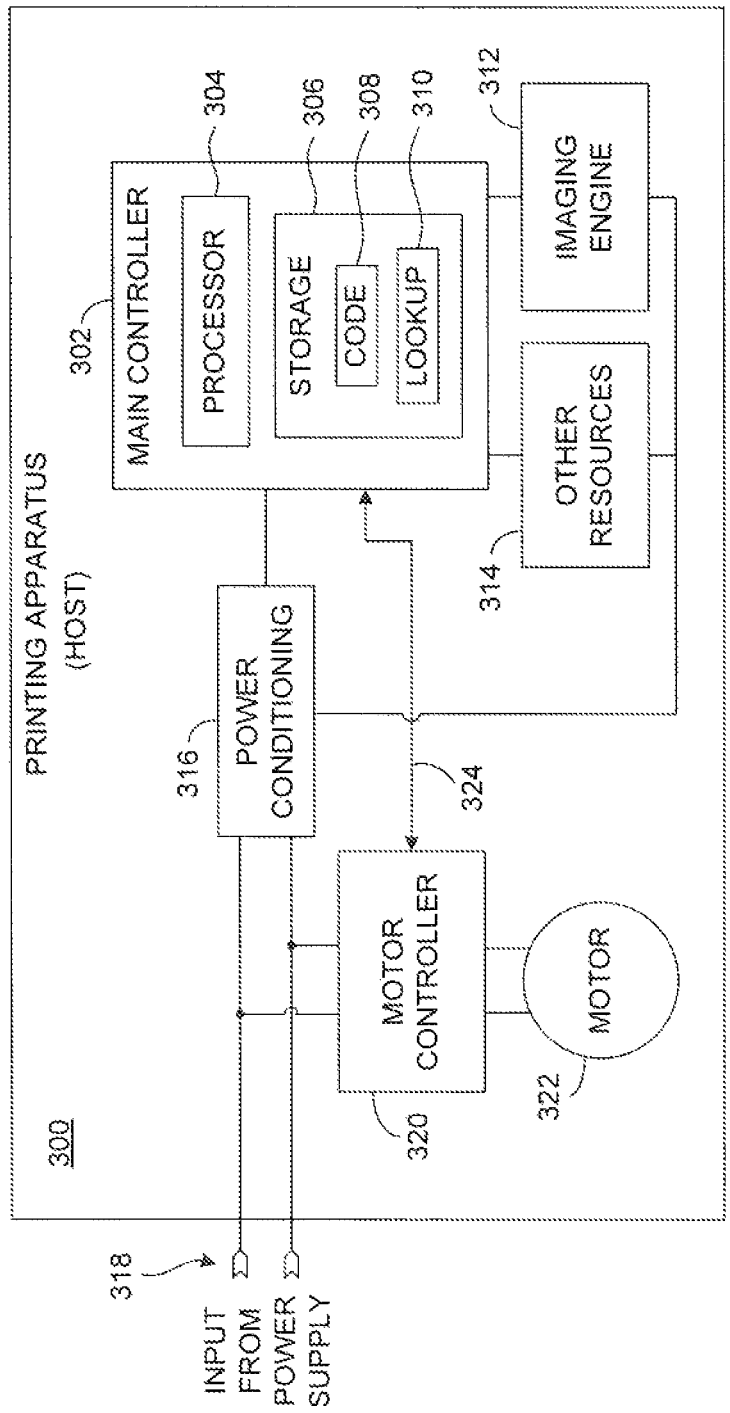
FIG. 3 is a block diagram of printing apparatus according to another example of the present teachings.

Attention is now directed to FIG. 3, which depicts a block diagram of a printing apparatus (printer) 300. The printer 200 is illustrative and non-limiting with respect to the present teachings. Thus, other printers, devices or systems can be configured and/or operated in accordance with the present teachings. In one example, the printer 300 is coupled to a power supply 200 as host and slave devices, respectively. Thus, the printer 300 is also referred to as a host or load device for purposes herein.

The printer 300 includes a main controller 302. The main controller 302 is configured to control various normal operations of the printer 300 so as to form images on sheet media in accordance with digital data or electronic signaling. The main controller 302 includes a processor 304 configured to operate in accordance with a computer-readable program code. The processor 304 can be variously defined by a microprocessor, a microcontroller, and so on.

The main controller 302 also includes storage media 306. The storage media 306 can be suitably defined by non-volatile memory, optical or magnetic storage, programmable read-only memory (PROM), and so on. Other forms of storage media 306 can also be used.

The storage media 306 includes (or stores) a program code 308 and a lookup table 310. The program code 308 is readable by and configured to cause the processor 304 to perform normal operations of the printer 300. That is, the various normal operations of the printer 300 are substantially defined or governed by the program code 308. In turn, the lookup table 310 is configured to provide information and data to the processor 304 for use during normal operations. Non-limiting examples of information that can be stored within the lookup table 310 include communication protocols, command codes, access passwords, encryption keys, predefined messages or status indications, and so on.

The printer 300 also includes an imaging engine 312. The imaging engine 312 can be defined by or include suitable resources such as ink-jetting print heads, a laser imaging engine, and so on. The imaging engine 312 is configured to form images, text and indicia on sheet media (such as paper) in response to electronic control signals from the main controller 302.

The printer 300 also includes other resources 314. Such other resources can include any number of entities, device or sub-systems as required for supporting normal printer 300 operations. Non-limiting examples of other resources 314 include a user interface, input/output circuitry, wireless communications circuitry, network communications hardware, and so on.

The printer 300 also includes power conditioning 316. Power conditioning 316 receives electrical energy at in input 318 from a power supply 200 or another, analogous power supply according to the present teachings. In one example, the output 218 of the power supply 200 is connected directly to the input 318 of the printer 300. The power conditioning 316 is configured to condition or regulate one or more characteristics of the electrical energy from the power supply. Thus, the power conditioning 316 can include filtering, derivation of various voltages from the input 318 voltage, and so on.

The printer 300 further includes a motor controller 320. The motor controller 320 can be variously defined by electronic circuitry, a processor or microcontroller running a program code, and so on. For purposes of example herein, the motor controller 320 is defined, at least in part, by an application-specific integrated circuit (ASIC), as available from Texas Instruments, Dallas, Tex., USA. The motor controller 320 is configured to provide a controlled delivery or coupling of the electrical power at input 318 to a motor 322. In one example, the motor controller 320 controls the delivery of electrical power by way of pulse-width modulation (PWM) switching. Other control methodologies can also be used.

The printer 300 also includes the motor 322 introduced above. In one example, the motor 322 is configured to drive the movement of a printhead carriage (not shown) during normal printing operations. In another example, the motor 322 is configured to transport sheet media (not shown) within the printer 300. The motor 322 can be configured and used for other purposes as well.

The motor controller 320 is configured for bidirectional data communication with the main controller 302 by way of pathway 324. Thus, the motor controller 320 can receive commands from the main controller 302 during normal operations. The motor controller 320 can also communicate data and status signals to the main controller 302.

The motor controller 320—the ASIC identified above—is also configured to detect voltage modulations (pulses or sags) present at the input 318 and to decode those modulations as meaningful digital data. The motor controller 320 is also configured to communicate at least some decoded digital data to the main controller 302. Furthermore, the motor controller 320 is configured modulate electrical current delivered to the motor 322 so as to generate current pulses in accordance with a communication protocol of the present teachings.

Such current pulses are sensed by the controller (slave) 202 within the power supply 200 by way of the feedback signaling at node 224 and decoded in accordance with the present teachings. In this way, bidirectional digital communication between the printer (host) 300 and the power supply (slave) 200 can be performed analogous to that of the system 100.

Illustrative State Machine

Figure 4:
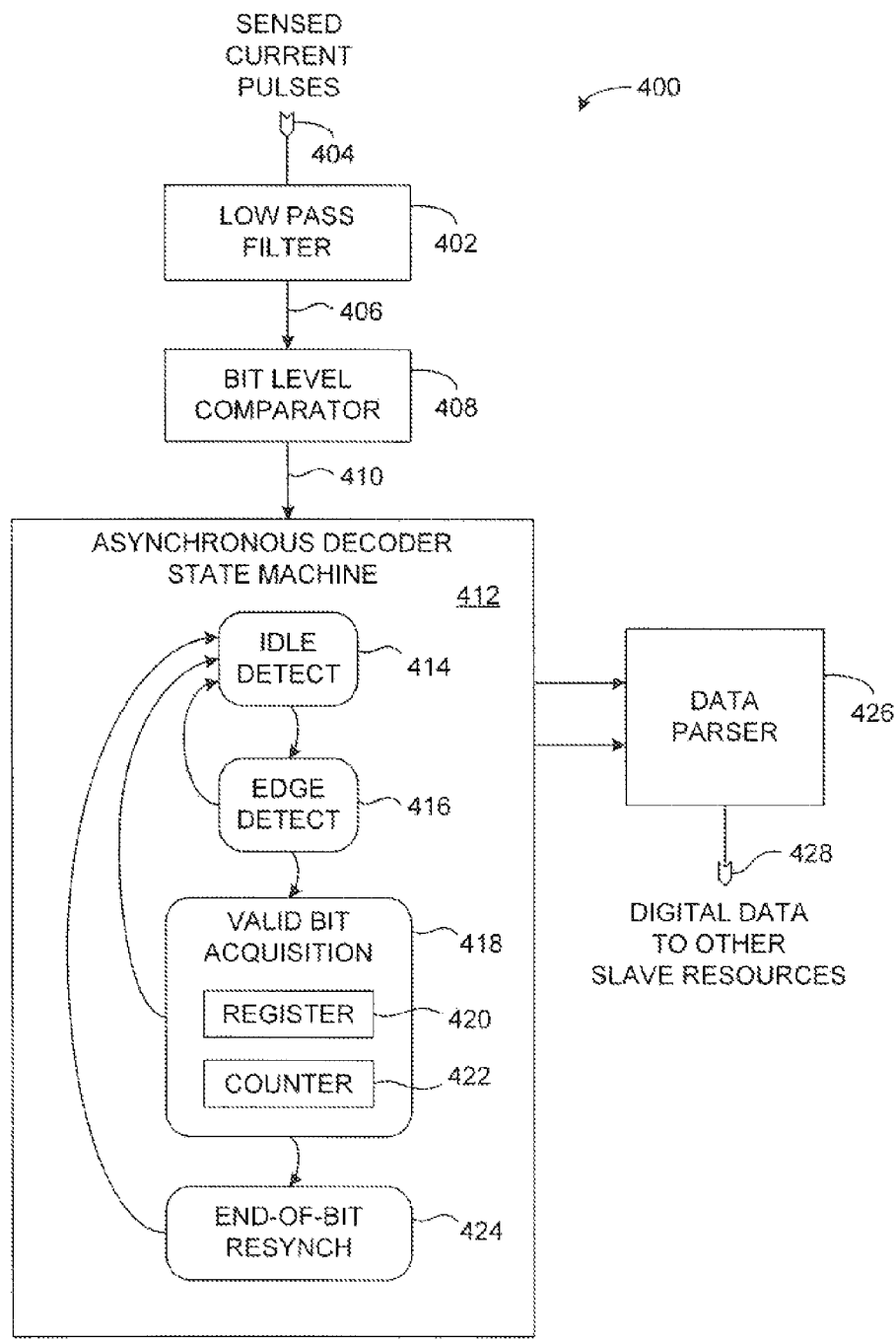
FIG. 4 is a block diagram of a state machine according to one example of the present teachings.

Attention is now turned to FIG. 4, which depicts a block diagram of a state machine 400 in accordance with the present teachings. The state machine 400 is illustrative and non-limiting in nature. The functional aspects of the state machine 400 are performed or embodied by the controller 202 ASIC within the power supply 200. The state machine 400 is therefore defined by specifically configured electronic circuitry having processor resources operating in accordance with a program code so as to function in accordance with the present teachings.

The state machine 400 includes a low-pass filter 402. The low-pass filter 402 is configured to receive electrical current pulses at an input 404. Such current pulses at the input 404 are understood to be provided by way of controlled modulation of current being provided to a load device such as, for example, the printer 300. The current pulses at the input 404 are sensed by way of the node 224.

The low-pass filter 402 is a moving average filter 402 that operates at a data sampling speed. In one example, an electrical signal at the input 404 is sampled at a rate of eight-hundred Hertz. Other sampling rates can also be used. The low-pass filter 402 then provides an output signal or filtered signal 406 equal to an average of the eight most recent samplings. Under this illustrative scheme, a span of eight sample periods is about equal to one data bit period or one bit-time. Thus, the low-pass filter is considered to over-sample the signal at the input 404.

The state machine 400 also includes a bit level comparator 408. The bit level comparator 408 is configured to sample the output signal 406 from the low-pass filter 402 and to compare each sample to a pair of threshold values. A digital bit stream 410 is generated in accordance with these comparisons. In one example, the threshold values are one-third Amp and two-thirds Amp, respectively, while the sampling frequency is one-hundred Hertz. The bit level comparator 408 therefore generates a digital bit stream 410 defined by a frequency of one-hundred Hertz. The digital bit stream 410 is further defined by rising edges and falling edges, respectively. In one example, a rising edge is logic "zero", and a falling edge is logic "one". Opposite definitions can also be used.

The state machine 400 further includes an asynchronous decoder state machine (ADSM) 412. The ADSM 412 is generally defined by four functional states as respectively described below. In one example, the ADSM 412 is defined by a Manchester decoder state machine.

The ADSM 412 includes an idle detect state 414. The idle detect state 414 is configured to monitor the digital bit stream 410 and to detect a predefined idle period. In one example, the predefined idle period is a sequence of four logic "zero" bits. That is, a valid idle period spans four consecutive bit-times (e.g., about forty milliseconds) when only logic "zeros" are present. The ADSM 412 remains at the idle detect state 414 until a valid idle period is detected within the digital bit stream 410, at which point the ADSM advances to the state 416 below.

The ADSM 412 includes an edge detect state 416. The edge detect state 416 is configured to monitor rising and falling edges within the digital bit stream 410 after a valid idle period has been detected during state 414. The edge detect state 416 runs concurrently with a state 418 below. If the edge detect state 416 detects an invalid edge transition, the ADSM 412 abandons the present digital bit stream 410 and returns to the idle detect state 414 above. Otherwise the edge detect state 416 continues to monitor the digital bit stream 410 until an ADSM reset event occurs as discussed below.

The ADSM 412 includes a valid bit acquisition state 418. The valid bit acquisition state 418 loads the digital bit stream 410 into a bit-shift register 420 in a bit-shifting, first-in/first-out sequence. The valid bit acquisition state 418 further increments a counter 422 for each bit loaded into to the bit-shift register 420. The bit-shift register 420 is also referred to as a register 420 for purposes herein. In the present example, the register 420 has an eight-bit (or one byte) width or capacity.

In one example, a first plurality of bits received after the valid idle period are referred to as start bits. For purposes of the present example, the valid start bits are "one-zero-one-one-zero", or "10110", in order. The valid bit acquisition state 418 is configured to check the first five bits loaded into the register 420 to verify that the proper start it sequence has been received. If valid start bits are received, the valid bit acquisition state 418 continues to load the next sequence of bits into the register 420, incrementing the counter accordingly. If a valid start bit sequence is not received, the ADSM 412 resets the register 420 and the counter 422 to respective initial or default values and returns to the idle detect state 414 above. Such a return to the idle detect state 414 is referred to as an "ADSM reset" for purposes herein.

The ADSM 412 also includes an end-of-bit resynchronization (resynch) state 424 which runs concurrently with the edge detect state 416 and the valid bit acquisition state 418. The end-of-bit resynch state 424 is configured to monitor the digital bit stream 410 and detect extraneous or unexpected rising or falling edges therein. That is, the end-of-bit resynch state 424 monitors the bit-times (spacing or synchronization) of the rising and falling edges in the digital bit stream 410 and detects any extra edge, missing edge or other invalid event. If such invalid event is detected, the end-of-bit resynch state 424 invokes an ADSM reset and the ADSM 412 returns to the idle detect state 414 above. If no invalid event is detected, the end-of-bit resynch state 424 continues to operate in a transparent, non-influential manner.

The state machine 400 also includes a data parser 426. The data parser 426 receives or monitors the present contents of the register 420 and the present value of the counter 422. At predetermined points or "bit groupings", the data parser 426 copies the present eight bit contents, or a portion thereof, to an output 428. The digital information at output 428 defines various respective data or command codes (i.e., message components) used by other resources of the controller 202.

In general, and without limitation, the state machine 400 is configured to receive electrical signaling at the input 404. The electrical signaling can, from time to time, include pulses generated by modulating current to a motor or other load within a load device such as the printer 300. The state machine 400 then processes these pulses to derive meaningful digital data that can be used to adjust or alter one or more operating parameters of the power supply 200. The digital data can also be in the form of a query for information such as a present operating parameter, the temperature of the power supply 200, and so on.

The controller 202 is further configured to provide a response to a query by modulating a voltage regulation point so that output voltage at 218 include sags, spikes, or other characteristics. Such characteristics are detectable by the motor controller 320 or a similar ASIC within the load device 300 and interpreted as a response, an acknowledgement of a command received by the power supply 200, and so on.

Illustrative Method

Figure 5:
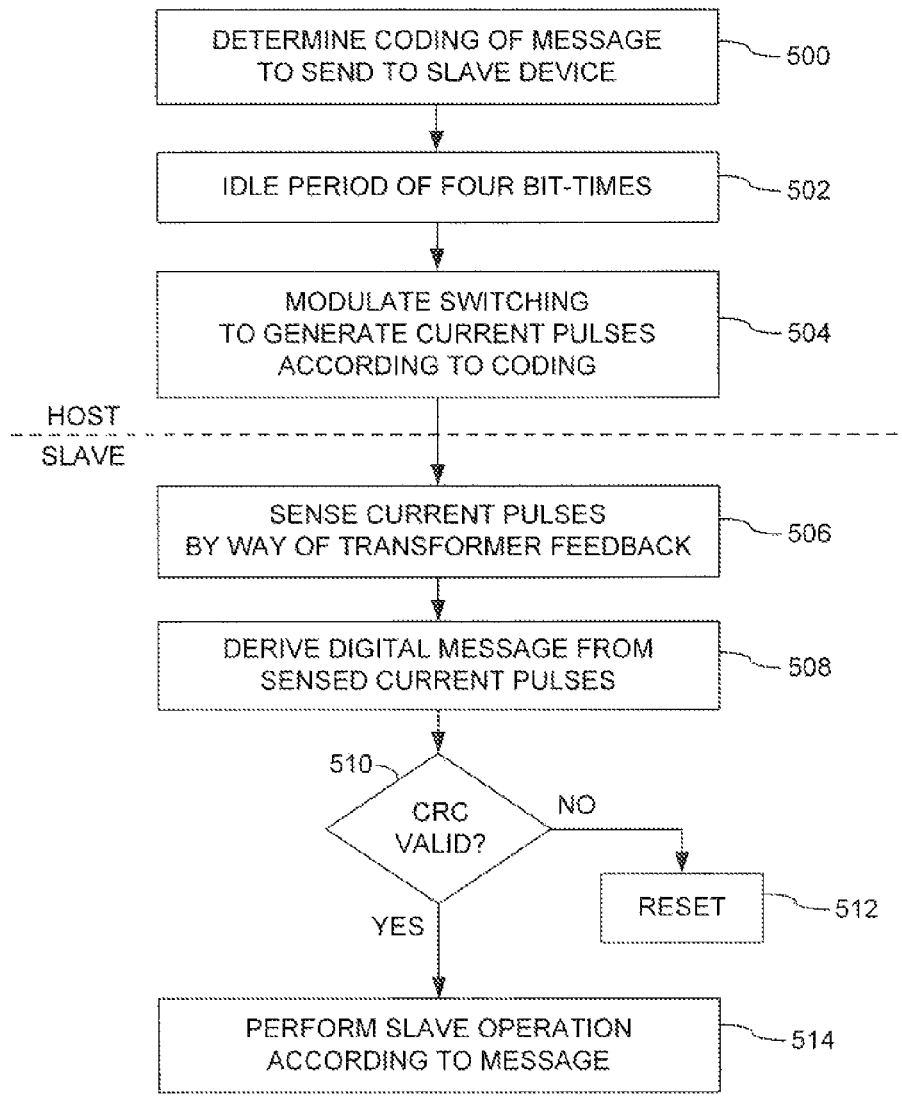
FIG. 5 is a flow diagram of a method of communication from a host entity to a slave entity according to one example of the present teachings.

Reference is now made to FIG. 5, which depicts a flow diagram of a method according to the present teachings. The method of FIG. 5 includes particular operations and order of execution. However, other methods including other operations, omitting one or more of the depicted operations, and/or proceeding in other orders of execution can also be used according to the present teachings. Thus, the method of FIG. 5 is illustrative and non-limiting in nature. Reference is made to FIGS. 2, 3 and 4 in the interest of understanding FIG. 5. The method of FIG. 5 is depicted as a linear sequence of events in the interest of clarity. However, it is to be understood that at least some of the operations or steps of FIG. 5 can be performed simultaneously or nearly so.

At 500, coding is determined for a message to be sent to a slave device. For purposes of example, a printer 300 requires a four percent (i.e., 4%) increase in the voltage being received from a power supply 200. The main processor sends a corresponding message to a motor controller (an ASIC) 320. The motor controller 320 constructs a digital message in accordance with the new voltage requirement. The message is twenty-four bits in length and compliant with a communication protocol according to the present teachings.

At 502, an idle period of four bit-times is observed. For purposes of the present example, the motor controller 320 holds the electrical current to a motor 322 steady for a time span equal to four bit-time periods. In one example, such a time span is about forty milliseconds. As such, the electrical current drawn from the power supply 200 remains about constant with no significant sags or spikes. A controller 202 within the power supply detects this idle period by way of feedback signaling at a node 224. In response, the controller 202 anticipates a communication from the printer 300 to begin in the next bit-time period.

At 504, current pulses are generated according to the message coding by modulated switching of the electrical current. For purposes of the present example, the motor controller 320 switches electrical current flow to the motor 322 so as to generate current pulses having rising and falling edges in accordance with the twenty-four bit message to be sent to the power supply 200.

At 506, the current pulses are sensed by way of transformer feedback. For purposes of the present example, the controller 202 senses the current pulses being generated by the printer 300 by way of the node 224. The current pulses—seen as voltage pulses—are present at the node 224 by way of the secondary winding 220 of the transformer 204.

At 508, a digital message is derived from the sensed current pulses. For purposes of the present example, the controller 202 constructs a digital message from the pulses sensed at the node 224. In particular, a state machine 400 of the controller 202 detects the current pulses, and shapes or conditions them into digital bits ("ones" and "zeros"). The state machine 400 further tests the validity of the bits in terms of rising and falling edge integrity, timing, spacing, the presence of a valid start bit sequence ("10110"), and so on. For purposes here, it is assumed that valid bits and sequences thereof are received in accordance with the communications protocol of the present teachings. The bits are progressively loaded into the bit-shift register 420 and parsed into their respective message components.

At 510, it is determined if a cyclic redundancy check (CRC) bit sequence is present at the end of the digital message. For purpose of the present example, it is understood that the final five bits of the twenty-four bit digital message are designated as "CRC" bits. The state machine 400 tests these bits against the protocol to verify if they are valid with respect to the rest of the digital message. If the CRC bits are valid, then the method proceeds to step 514 below. If the CRC bits are not valid, then the method proceeds to step 512 below.

At 512, the state machine invokes a reset condition. For purposes of an example contrary to the present example, the just-received digital message is considered invalid and is ignored. As such, no adjustment, calibration or other substantive action is taken by the controller 202. The register 420 and the counter 422 are reset to respective default values (i.e., zeroed or purged, etc.) and the ADSM 412 of the state machine 400 returns to the idle detect state 414. The present instance of operation would then be complete with respect to such an invalid digital message.

At 514, slave operations are performed in accordance with the digital message. For purposes of the present example, the controller (slave) 202 interprets the parsed digital message and responds by making an output voltage increase of four percent. This is done by loading an appropriate data value into a corresponding register of the controller 202. The controller 202 now regulates the output 218 of the power supply 200 at this new, relatively greater voltage level. The method of FIG. 5 is now complete for the present example.

Illustrative Method

Figure 6:
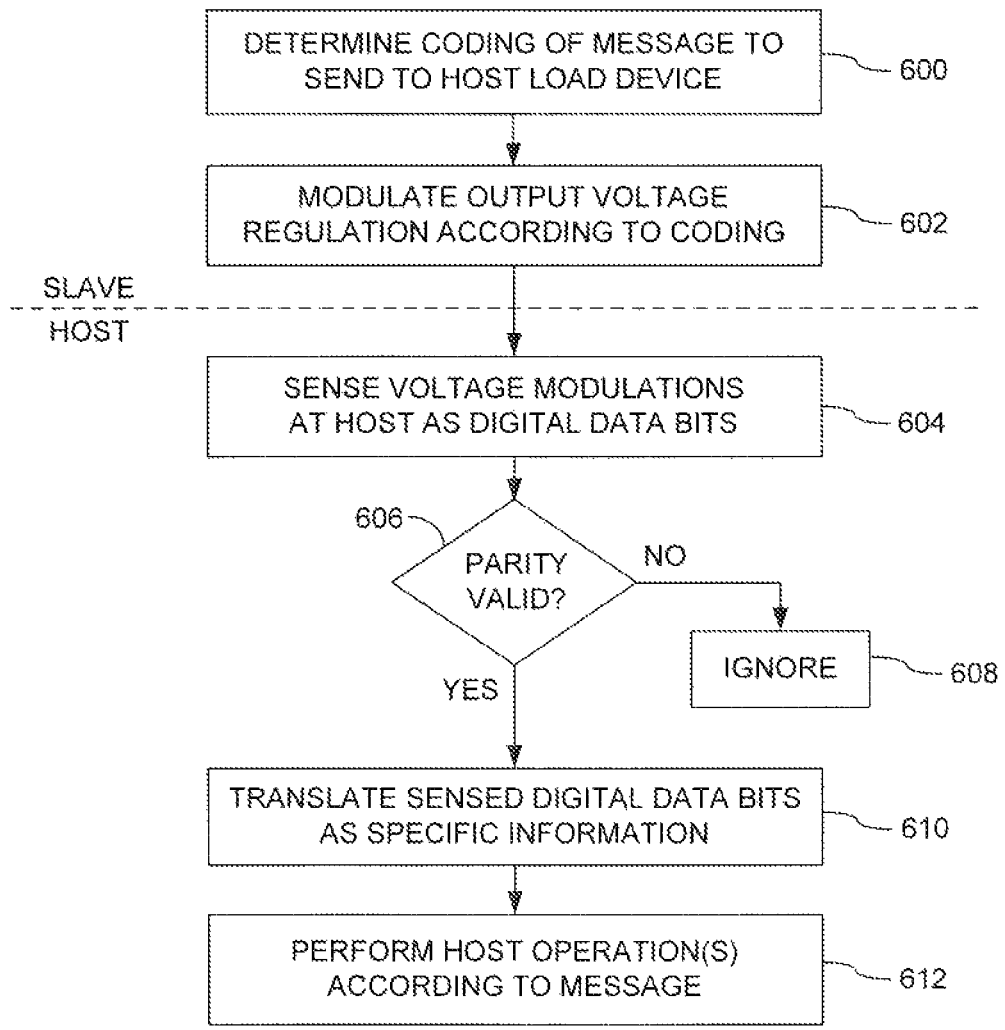
FIG. 6 is a flow diagram of a method of communication from a slave entity to a host entity according to one example of the present teachings.

Reference is now made to FIG. 6, which depicts a flow diagram of a method according to the present teachings. The method of FIG. 6 includes particular operations and order of execution. However, other methods including other operations, omitting one or more of the depicted operations, and/or proceeding in other orders of execution can also be used according to the present teachings. Thus, the method of FIG. 6 is illustrative and non-limiting in nature. Reference is made to FIGS. 2, 3 and 4 in the interest of understanding FIG. 6. The method of FIG. 6 is depicted as a linear sequence of events in the interest of clarity. However, it is to be understood that at least some of the operations or steps of FIG. 6 can be performed simultaneously or nearly so.

At 600, coding is determined for a message to be sent to a host load device. For purposes of example, a controller 202 is responding to a printer (host) 300 request for a temperature of the power supply 200. The controller 202 constructs a digital message in accordance with the temperature request in accordance with a communication protocol of the present teachings.

At 602, output voltage regulation is modulated in accordance with the message coding. For purposes of the present example, the controller 202 modulates the voltage at output 218 by way of PWM signaling to the switch 212. Variations in the voltage in the form of sags or spikes are communicated to the printer 300 in accordance with the protocol. In one example, a voltage sag or decrease of five percent for a period of one bit-time (e.g., ten milliseconds) constitutes logic "zero", while no sag or drop in voltage constitutes logic "one". A single logic "zero" is referred to as an acknowledgement bit or "DACK". In this example a DACK is sent followed by eight data bits—one byte of information encoded to provide the requested temperature.

At 604, the voltage modulations are sensed via an application specific integrated circuit (ASIC) within the host load device. For purposes of the present example, the motor controller 320 within the printer 300 senses the voltage modulations and constructs a sequence of corresponding data bits.

At 606, it is determined if a correct parity bit is present at the end of the digital message. For purpose of the present example, it is understood that the final bit of an eight-bit byte is a parity bit. The motor controller 320 then compares the parity bit with balance of the data bits received to determine if parity is correct. If the parity bit is valid, then the method proceeds to step 610 below. If the parity bit is not valid, then the method proceeds to step 608 below.

At 608, the just-received data bits are ignored. For purpose of an example contrary to the present example, it is assumed that parity was not valid and the data bits are ignored and purged from the motor controller 320. The motor controller 320 and the balance of the printer 300 continue to operate normally as if the digital bits have never been received. The present instance of operation would then be complete with respect to such an invalid digital message.

At 610, the digital bits are translated as specific information. For purposes of the present example, the motor controller 320 translates or interprets the digital bits (aside from the parity bit) as a specific temperature reading for the power supply 200.

At 612, host operations are performed in accordance with the digital message. For purposes of the present example, the motor controller 320 communicates the temperature reading to the main controller 302. The main controller 302 can then respond by decreasing operating speed, shutting down certain resources, and so on if the temperature reading is abnormal or excessive. Conversely, if the temperature reading indicates that the power supply 200 is operating within desirable thermal parameters, the main controller 302 can respond by intensifying print speed, activating resources which have been in a sleep mode, and so on. Other operations corresponding to other types of received information can also be performed.

Illustrative Communication Protocol

Attention is turned to FIG. 7, which is a table depicting a communications protocol (protocol) 700. The protocol 700 is illustrative and non-limiting in nature. Other protocols defined by respectively varying characteristics can also be used in accordance with the present teachings. The protocol 700 is illustrative of communications based on current pulses (e.g., 108) from a host entity (e.g., 104) to a slave entity (e.g., 102). Specifically, the protocol is illustrative of digital messaging received and acted upon by a controller (e.g., 202) of a power supply (e.g., 200). The protocol 700 provides for the communication of a twenty-four bit message from the host to the slave entity.

The protocol 700 includes an idle period 702. The idle period 702 is the first event or sequence of digital bits (or their equivalent) sent from the host to the slave to indicate that a communicational bit stream is forthcoming. The idle period 702 is defined by four bit-time periods equal to logic "zero", or "0000". That is, four consecutive bit-time periods of no current pulses (about constant) host current consumption.

The protocol 700 also includes start bits 704. The start bits 704 are the next sequence of digital bits after the idle period 702. As depicted, the five start bits 704 are "one-zero-one-one-zero", or "10110". Other start bits 704 sequences or numbers of bits can also be used. The start bits 704 occupy bit locations nineteen through twenty-three in the twenty-four bit message of the present example.

The protocol 700 also includes a write/read bit 706. The write/read bit 706 is the next sequence of digital bits after the start bits 704. The write/read bit 706 is logic "zero" to indicate a data or value write operation, and a logic "one" to indicate a data or value read operation. The write/read bit 706 occupies bit location eighteen in the twenty-four bit message of the present example.

The protocol 700 also includes five address bits 708, which are the next sequence of digital bits after the write/read bit 706. The address bits 708 indicate which slave operation, value or parameter is being accessed or adjusted by way of the present message. Discussion of various parameters and value according to one example of the present teachings is provided hereinafter. The address bits 708 occupy bit locations thirteen through seventeen in the twenty-four bit message of the present example.

The protocol 700 also includes eight data bits 710, which are the next sequence of digital bits after the address bits 708. The data bits 710 provide a specific value to be written to a variable or register of the slave entity, or specify a register or variable to be read and communicated back to the host entity. The data bits 710 occupy bit locations five through twelve in the twenty-four bit message of the present example.

The protocol further includes five cyclic redundancy check (CRC) bits 712. The CRC bits 712 are the next sequence of digital bits after the data bits 710, and are the last bits of the twenty-four bit message. The CRC bits 712 provide a check code or confirmation code that is used to verify that a valid twenty-four bit message has been received by the slave entity. One having ordinary skill in the digital communications or related arts is familiar cyclic redundancy checking, and further elaboration is not required for purposes of understanding the present teachings.

Illustrative Slave Entity Parameters and Functions

Reference is made to FIG. 8, which is a table depicting a set (or partial set) 800 of parameters and functions of a controller or slave entity. Specifically, the set 800 includes parameters and functions of a controller 202 that is programmed or configured in accordance with the present teachings. The set 800 is illustrative and non-limiting in nature, and other sets include some or all of the depicted parameters or functions, or including other parameters or functions, can also be used.

The set 800 includes a temperature status function 802, corresponding to address zero-one hexadecimal (i.e., "01 H"). The temperature status function 802 is a query requesting that the controller 202 provide a two bit digital response or code corresponding to the approximate temperature of the slave entity (e.g., power supply 200) since the last reset event. In one example, the bit correspondences to temperature ranges are provided in Table 1 below:

TABLE 1

Temperature Status Function 802

| Bit Code | Temperature "T" of Slave Entity |
|---|---|
| 00 H | T > 120 Deg Celsius |
| 01 H | 120 >= T > 90 Deg Celsius |
| 10 H | 90 >= T >= 50 Deg Celsius |
| 11 H | T < 50 Deg Celsius |

The set 800 also includes a course voltage trim 804, corresponding to address zero-nine hexadecimal (i.e., "09 H"). The course voltage trim 804 is a readable and writable register within the controller 202. The course voltage trim 804 determines incremental increases or reductions in the voltage regulation level at the output 218 of a power supply 200. In one example, the course voltage trim 804 includes incremental adjustments as provided in Table 2 below:

TABLE 2

Course Voltage Trim 804

| Data Bits 3:0 Value | Course Adjustment |
|---|---|
| 15 | Increase 14% |
| 14 | Increase 14% |
| 13 | Increase 12% |
| 12 | Increase 10% |
| 11 | Increase 8% |
| 10 | Increase 6% |
| 9 | Increase 4% |
| 8 | Increase 2% |
| 7 | Increase 0% (Default value) |
| 6 | Decrease 2% |
| 5 | Decrease 4% |
| 4 | Decrease 6% |
| 3 | Decrease 8% |
| 2 | Decrease 10% |
| 1 | Decrease 12% |
| 0 | Decrease 14% |

The set 800 also includes a fine voltage trim 806, corresponding to address zero-B hexadecimal (i.e., "0B H"). The fine voltage trim 806 is a readable and writable register within the controller 202. The fine voltage trim 806 determines incremental increases or reductions in the voltage regulation level at the output 218 of a power supply 200. In one example, the fine voltage trim 806 includes incremental adjustments as provided in Table 3 below:

TABLE 3

Fine Voltage Trim 806

| Data Bits 3:0 Value | Fine Adjustment |
|---|---|
| 15 | Increase 1.75% |
| 14 | Increase 1.75% |
| 13 | Increase 1.5% |
| 12 | Increase 1.25% |
| 11 | Increase 1.0% |
| 10 | Increase 0.75% |
| 9 | Increase 0.5% |
| 8 | Increase 0.25% |
| 7 | Increase 0.0% (Default value) |
| 6 | Decrease 0.25% |
| 5 | Decrease 0.5% |
| 4 | Decrease 0.75% |
| 3 | Decrease 1.0% |
| 2 | Decrease 1.25% |
| 1 | Decrease 1.5% |
| 0 | Decrease 1.75% |

The set 800 further includes a sleep mode 808, corresponding to address zero-D hexadecimal (i.e., "0D H"). The sleep mode 808 is a write-only function, wherein the most significant bit (MSB) of the data bits (e.g., data bits 710) is an enable/disable bit. In one example, the sleep mode 808 is enabled when the MSB is logic "zero", and the sleep mode 808 is disabled when the MSB is logic "one". The remaining seven bits of the eight-bit data byte are ignored for purposes of the sleep mode 808. Enablement of the sleep mode 808 results in a substantial reduction in electrical power at the output 218 by way of controller 202 operation.

The set 800 also includes a control chip serial number 810, corresponding to address one-D hexadecimal (i.e., "1D H"). The control chip serial number 810 provides a unique digital identifier for the controller 202 ASIC presently being addressed or used.

In general, and without limitation, the present teachings contemplate systems including a power supply (slave) and a load device or apparatus (host). A controller of the power supply has a plurality of operating modes and functions that are accessible or adjustable by way of communication with the load device. Load device queries for information regarding the present state, configuration or other aspects of the controller can also be answered.

In particular, the controller of the power supply senses current pulses by way of transformer feedback signaling and conditions these pulses into digital bits. The digital bits are then subjected to validity testing in accordance with a communication protocol of the present teachings. Digital data and commands can be transmitted from the load device to the power supply by way of this communication protocol. The controller of the power supply then adjusts output voltage or other parameters, invokes various operating modes, and so on, in accordance with valid communications from the load device.

In turn, the controller acknowledges valid communications and commands from the load device by way of modulating the regulated voltage output from the power supply. Additionally, data such as a temperature or the present value of an internal register of the controller can be communicated to the load device by way of such voltage modulation. The load device includes a load controller or other circuitry configured to communicate data and commands to the power supply, and to receive acknowledgements and answers to queries there from.

The systems of the present teachings provide for power supplies that can be more closely matched to the respective load devices that they serve. Such matching is performed automatically as needed or desired during normal operations. Output voltage adjustments, invocation of a sleep mode, and other functions and operations can thus be performed in accordance with the present teachings.

In general, the foregoing description is intended to be illustrative and not restrictive. Many embodiments and applications other than the examples provided would be apparent to those of ordinary skill in the art upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future embodiments. In sum, it should be understood that the invention is capable of modification and variation and is limited only by the following claims.

What is claimed is:

1. Electronic circuitry configured to:
at an electrical power supply, sense current pulses generated by a load receiving electrical energy from the electrical power supply, the current pulses being generated by the load using modulated switching of a current being drawn by the load from the power supply;
apply a moving average filter to the sensed current pulses generated by the load receiving electrical energy from the electrical power supply to derive a filtered signal;
compare the filtered signal to a pair of threshold values to derive a digital bit stream of a message represented by the current pulses generated by the load;
provide the digital bit stream to an asynchronous decoder state machine (ADSM) including a register and a bit counter, the ADSM loading the digital bit stream into the register and incrementing the bit counter in accordance with validity testing states;
parse the contents of the register using the bit counter to derive digital data of the message; and
adjust an operating parameter of the electrical power supply in accordance with the digital data of the message.

2. The electronic circuitry according to claim 1, the ADSM configured such that the validity testing states include:
detecting an idle period spanning four consecutive bit-times within the digital bit stream;
detecting a valid sequence of start bits within the digital bit stream; and
detecting valid rising edges and valid falling edges and valid bit-times within the digital bit stream.

3. The electronic circuitry according to claim 1, the ADSM further configured to reset the register and the bit counter to respective default values in response to detecting an invalid event by way of the validity testing states.

4. The electronic circuitry according to claim 1, the moving average filter operating by way of averaging a most recent eight consecutive samplings of the electrical feedback signal.

5. The electronic circuitry according to claim 1 further configured to sense the electrical feedback signal by way of a secondary winding of a transformer electrically coupled to the electronic circuitry.

6. The electronic circuitry according to claim 1, further configured such that the digital bit stream is characterized by respective rising edges and falling edges.

7. The electronic circuitry according to claim 1, the operating parameter of the power supply including at least a course voltage calibration, or a fine voltage calibration.

8. The electronic circuitry according to claim 1, further configured to communicate information regarding a characteristic of the power supply in response to the digital data of the message.

9. The electronic circuitry according to claim 1, at least the ADSM provided by way of an application-specific integrated circuit.

10. A controller configured to:
modulate an output of electrical energy from a power supply to represent a first message from the power supply to a load receiving electrical energy from the power supply;
sense pulse signals generated by the load receiving electrical energy from the power supply by way of sensing feedback signaling provided by way of a secondary winding of a transformer of the power supply, the pulse signals being generated by the load using modulated switching of a current being drawn by the load from the power supply;
process the pulse signals to derive digital data of a second message; and
adjust respective operating parameters of the power supply in accordance with the digital data of the second message.

11. The controller according to claim 10, further configured to:
filter the pulse signals by way of a moving average filter to derive a filtered signal; and
compare the filtered signal to a pair of threshold values to derive a digital bit stream of the first message characterized by respective rising edges and falling edges.

12. The controller according to claim 11, further configured to:
detect an idle period within the digital bit stream;
detect valid rising edges and falling edges and bit-times within the digital bit stream;
detect a valid start bit-sequence within the digital bit stream;
load a bit-shift register using the digital bit stream; and
increment a counter in accordance with the loading of the bit-shift register.

13. The controller according to claim 12, further configured to parse the contents of the bit-shift register by way of the counter to derive digital data of the first message.

14. The controller according to claim 12, further configured to reset the bit-shift register and the counter to respective initial values in response to detecting an invalid event in the digital bit stream.

15. A storage media including a program code, the program code configured to cause one or more processors of an apparatus receiving electrical energy from a power supply to:
determine coding of a digital message to be sent to the power supply from the apparatus receiving electrical energy from the power supply;

generate current pulses according to the determined coding of the digital message by modulated switching of an electrical current being drawn by the apparatus from the power supply;

receive, at the apparatus receiving the electrical energy from the power supply, a digital reply from the power supply, the digital reply comprising modulations produced by the power supply in the electrical current being drawn by the apparatus from the power supply; and control the apparatus receiving electrical energy from the power supply in accordance with the digital reply.

\* \* \* \* \*